United States Patent
Sung

(10) Patent No.: US 8,537,907 B2
(45) Date of Patent: Sep. 17, 2013

(54) RECEIVING SYSTEM FOR USE IN NEAR FIELD COMMUNICATION AND MODE DETECTION METHOD THEREFORE

(75) Inventor: HyukJun Sung, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 317 days.

(21) Appl. No.: 12/972,793

(22) Filed: Dec. 20, 2010

(65) Prior Publication Data

US 2011/0206142 A1 Aug. 25, 2011

(30) Foreign Application Priority Data

Feb. 23, 2010 (KR) .................. 10-2010-0016279

(51) Int. Cl.
 *H04L 27/00* (2006.01)
(52) U.S. Cl.
 USPC ........... 375/259; 375/316; 375/340; 375/219; 375/320; 375/353; 375/321; 329/311; 329/361; 329/358; 455/41.2; 455/41.1; 455/39
(58) Field of Classification Search
 USPC ............... 375/316, 259, 340, 219, 320, 353, 375/321; 329/311, 361, 358; 455/41.2, 41.1, 455/39
 See application file for complete search history.

(56) References Cited

U.S. PATENT DOCUMENTS

| | | | |
|---|---|---|---|
| 7,471,200 B2 | 12/2008 | Otranen | |
| 7,711,323 B2* | 5/2010 | Fujii | 455/41.1 |
| 7,907,005 B2* | 3/2011 | Kranabenter | 329/311 |
| 2003/0091116 A1* | 5/2003 | Yap et al. | 375/247 |
| 2006/0245402 A1* | 11/2006 | Fujii et al. | 370/338 |
| 2007/0126584 A1* | 6/2007 | Hyde et al. | 340/572.4 |
| 2008/0299907 A1 | 12/2008 | Takayama | |
| 2009/0051498 A1 | 2/2009 | Otranen | |
| 2009/0322484 A1* | 12/2009 | Toriyama et al. | 340/10.1 |
| 2010/0105324 A1* | 4/2010 | Takayama | 455/41.2 |
| 2010/0124258 A1* | 5/2010 | Sekiguchi et al. | 375/219 |

FOREIGN PATENT DOCUMENTS

| | | |
|---|---|---|
| EP | 1845632 | 10/2007 |
| JP | 2006-211519 | 8/2006 |
| JP | 2008-160856 | 7/2008 |
| WO | 2006/080435 | 8/2006 |

* cited by examiner

*Primary Examiner* — Siu Lee
(74) *Attorney, Agent, or Firm* — Stanzione & Kim, LLP

(57) ABSTRACT

A method of detecting a communication mode is provided to rapidly detect which one of near field communication (NFC) protocols includes a communication frame pattern of data provided to a receiving device. The method includes receiving a communication frame pattern of data transmitted from an NFC initiator after synchronizing the communication frame pattern with a predetermined sampling clock. The detection of the communication mode may be done by analyzing a start pattern out of the communication frame pattern. Since a communication mode is rapidly detected and data is automatically received without performing an additional operation to set the communication mode, operation performance of a receiving device is improved.

25 Claims, 7 Drawing Sheets

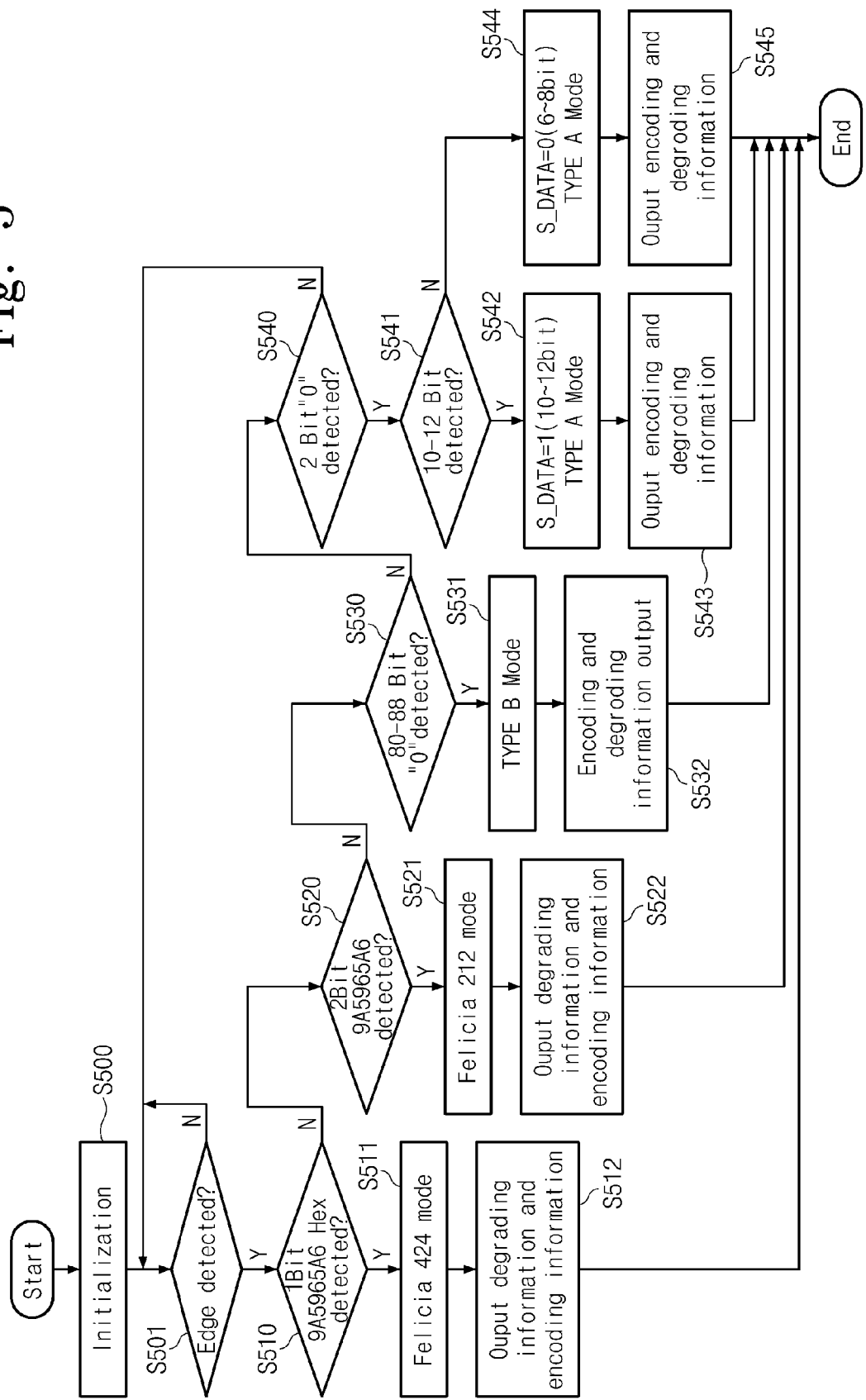

RECEIVING SYSTEM FOR USE IN NEAR FIELD COMMUNICATION AND MODE DETECTION METHOD THEREFORE

CROSS-REFERENCE TO RELATED APPLICATIONS

This U.S. non-provisional patent application claims the benefit of priority under 35 U.S.C. §119 to Korean Patent Application No. 10-2010-0016279, filed on Feb. 23, 2010, the entirety of which is hereby incorporated by reference

BACKGROUND

1. Field of the Invention

The present disclosure herein relates to near field communication (NFC) and, more particularly, to a receiving system for use in NFC and a mode detection method therefore.

2. Description of the Related Art

When a data transmitting device and a data receiving device are mutually disposed within a near field distance ranging from tens of centimeters to several meters, near field communication (NFC) is performed. For example, for contactless electronic payment or information recognition, a multimedia device such as a mobile phone is capable of communicating with a reader.

In an NFC system, transmitting data is transmitted through a transmission channel after being source-encoded in a predetermined encoding manner. For example, an initiator of ISO 18092 transmits a Manchester-encoded signal to an NFC target.

At the initial stage of transmission, the NFC initiator may transmit data in communication frame patterns of TYPEA 106 kbps, TYPEB 106 kbps, TYPEF 212 kbps (FELICA 212 kbps), and TYPEF 424 kbps (FELICA 424 kbps). Thus, what is required for allowing an NFC target to receive data is first to detect which protocol is the communication frame pattern, among NFC protocols. However, because data is not transmitted after any one communication mode among various types of protocols is preset at a target, an NFC target needs a device which is capable of detecting and receiving all communication modes of the various types of protocols.

A typical method for detecting an NFC communication mode is used to determine which protocol includes a communication frame pattern of data. According to the typical method, all devices capable of receiving protocols of TYPEA 106, TYPEB 106, FELICA 212, and FELICA 424 are provided in an NFC target and the TYPEA 106, the TYPEB 106, the FELICA 212, and the FELICA 424 are periodically set one after another by a control processor such as a central processing unit (CPU). Thus, if it is determined that data is normally received when a certain mode is set, a communication mode is decided as the set mode. However, the typical method requires relatively long time for detecting a communication mode and a complex procedure with software, which causes performance of a receiving device to be degraded.

Accordingly, there is a need for a receiving technique for use in near field communication (NFC) which is capable of rapidly detecting a communication mode and receiving data in the NFC.

SUMMARY

The present disclosure provides a method of detecting a communication mode.

Aspects and utilities of the present general inventive concept will be set forth in part in the description which follows and, in part, will be obvious from the description, or may be learned by practice of the present general inventive concept.

Features and/or utilities of the present general inventive concept may be realized by a method that includes receiving a communication frame pattern of data transmitted from a near field communication (NFC) initiator in accordance with a predetermined sampling clock and detecting a communication mode indicating which one of NFC protocols includes the communication frame pattern by analyzing a start pattern out of the communication frame pattern.

The start pattern may include an S pattern in case of TYPEA 106. The start pattern may be an SOF pattern in case of TYPEB 106. The start pattern may be a SYNC pattern in case of TYPEF 212 or TYPEF 424.

When the start pattern is analyzed, 1 bit of data behind the S pattern may be further included in the start pattern in case of the TYPEA 106.

The predetermined sampling clock may be a clock having a frequency at which data of TYPEF 424 is oversampled eight times.

The method may further include performing decoding and degrading by a corresponding protocol after detecting the communication mode.

Features and/or utilities of the present general inventive concept may also be realized by a receiving device for near field communication (NFC). The receiving device may include a detecting and receiving unit configured to detect a communication mode indicating which one of NFC protocols includes the communication frame pattern by analyzing a start pattern out of a communication frame pattern of provided data using a predetermined sampling clock and receive the data and a decoding and memory unit configured to degraded store data in a memory after performing decoding and degrading by a corresponding protocol in response to the detection of the communication mode.

The receiving device may be an NFC target configured to selectively receive data of TYPEA 106, data of TYPEB 106, data of TYPEF 212, and data of TYPEF 424 when the data is transmitted from an NFC initiator.

The receiving device may further include a process controller configured to read the degraded data stored in the memory in response to request data provided from the decoding and memory unit and check the detected communication mode.

When the start pattern is analyzed, the data of TYPEF 212 and the data of TYPEA 106 are oversampled twice and the data of TYPEB 106 is oversampled eight times on the basis of the TYPEF 424.

Features and/or utilities of the present general inventive concept may also be realized by a near field communication (NFC) system. The NFC system may include an NFC initiator configured to transmit data and an NFC target including a detecting and receiving unit configured to detect a communication mode indicating which one of NFC protocols includes the communication frame pattern by analyzing a start pattern out of a communication frame pattern of provided data using a predetermined sampling clock and receive the data and a decoding and memory unit configured to degraded store data in a memory after performing decoding and degrading by a corresponding protocol in response to the detection of the communication mode.

The NFC initiator may be a card reader, and the NFC target may be a portable multimedia terminal with a built-in smart card.

Features and/or utilities of the present general inventive concept may also be realized by a method of detecting a communication protocol in a near field communication (NFC) receiver, the method comprising receiving a near field communication including data and determining a protocol of the near field communication by analyzing a start pattern of a communication frame pattern of the data.

Determining the protocol may include detecting whether the start pattern may include a 1-bit 9A5965A6 hex, and setting a communication mode to correspond to a FELICIA 424 protocol when the start pattern includes the 1-bit 9A5965A6 hex.

Determining the protocol may include detecting whether the start pattern may include a 2-bit 9A5965A6 hex, and setting a communication mode to correspond to a FELICIA 212 protocol when the start pattern includes the 2-bit 9A5965A6 hex.

Determining the protocol may include detecting whether the start pattern may include an 80-88 bit "0" value, and setting a communication mode to correspond to a TYPEB 106 protocol when the start pattern includes the 80-88 bit "0" value.

Determining the protocol may include detecting whether the start pattern may include a 2-bit "0" value, and setting a communication mode to correspond to a TYPEA 106 protocol when the start pattern includes the 2-bit "0" value.

Determining the protocol may include determining whether the start pattern corresponds to one of a FELICIA 424 protocol, a FELICIA 212 protocol, a TYPEA 106 protocol, and a TYPEB 106 protocol, and the method further may include setting a communication mode to correspond to the detected protocol selected from among the FELICIA 424 protocol, the FELICIA 212 protocol, the TYPEA 106 protocol, and the TYPEB 106 protocol.

Setting the communication mode may include setting encoding and degrading settings of the NFC receiver.

Determining a protocol of the NFC may include sampling the start pattern at a frequency to correspond to an 8-times oversampling of a FELICIA 424 protocol.

A frequency of a sampling clock to sample the start pattern may be 6.78 MHz.

Determining the protocol of the NFC may include, before analyzing the start pattern of the data, detecting an edge of the communication frame pattern.

Features and/or utilities of the present general inventive concept may also be realized by a near field communication (NFC) receiver, including a detection circuit to receive a near field communication signal including data, and to detect a protocol of the received data from among a predetermined plurality of protocols by analyzing a start pattern of a communication frame pattern of the data.

The NFC receiver may include a clock generator to generate a sampling clock at which the detection circuit samples the start pattern of the data.

The NFC receiver may further include a decoding unit to receive the data and control signals from the detection circuit, and to decode the data according to the detected protocol.

The NFC receiver may further include a process controller to receive the decoded data and a mode selection signal corresponding to the detected protocol and to control an operation of the NFC receiver according to the decoded data.

Features and/or utilities of the present general inventive concept may also be realized by a near field communication (NFC) system, including an NFC transmitter to transmit an NFC signal including data and an NFC receiver to receive the NFC signal and to detect a protocol of the received data from among a predetermined plurality of protocols by analyzing a start pattern of a communication frame pattern of the data.

BRIEF DESCRIPTION OF THE DRAWINGS

The present general inventive concept will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present general inventive concept.

FIG. 5 a flowchart illustrating a communication mode detection operation of a detecting and receiving unit shown in FIG. 4.

DETAILED DESCRIPTION OF THE EMBODIMENTS

Figure 1:
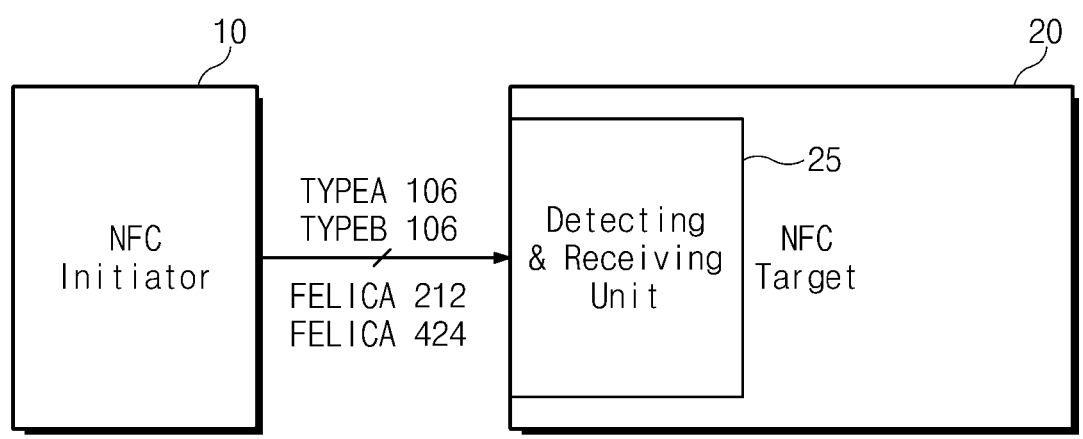
FIG. 1 is a block diagram of a near field communication (NFC) system according to embodiments of the present general inventive concept.

The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept.

In the specification, it will be understood that when an element is referred to as being "connected" or "coupled" to another element, it may be directly connected or coupled to the other element or intervening elements may be present.

In the drawings, the same or similar reference numerals denote the same or similar elements throughout the specification. In several drawings, connection relationships between devices and lines are merely set forth for effective description of technical aspects and other devices or circuit blocks may be further provided therebetween.

FIG. 1 is a block diagram of a near field communication (NFC) system according to embodiments of the present general inventive concept. As illustrated in FIG. 1, the NFC system includes an NFC initiator 10 and an NFC target 20. The NFC target 20 functions as a receiving device according to embodiments of the general inventive concept and includes a detecting and receiving unit 25. When the NFC initiator 10 transmits data of TYPEA 106, TYPEB 106, TYPEF 212 or TYPEF 424, the NFC target 20 rapidly detects which one of NFC protocols includes a communication protocol pattern of data transmitted through the detecting and receiving unit 25 and automatically receives data without performing an operation to set a communication mode. Thus, operation performance of the NFC target 20 is improved.

An example embodiment of communication mode detection will now be described below in detail.

Figure 2:
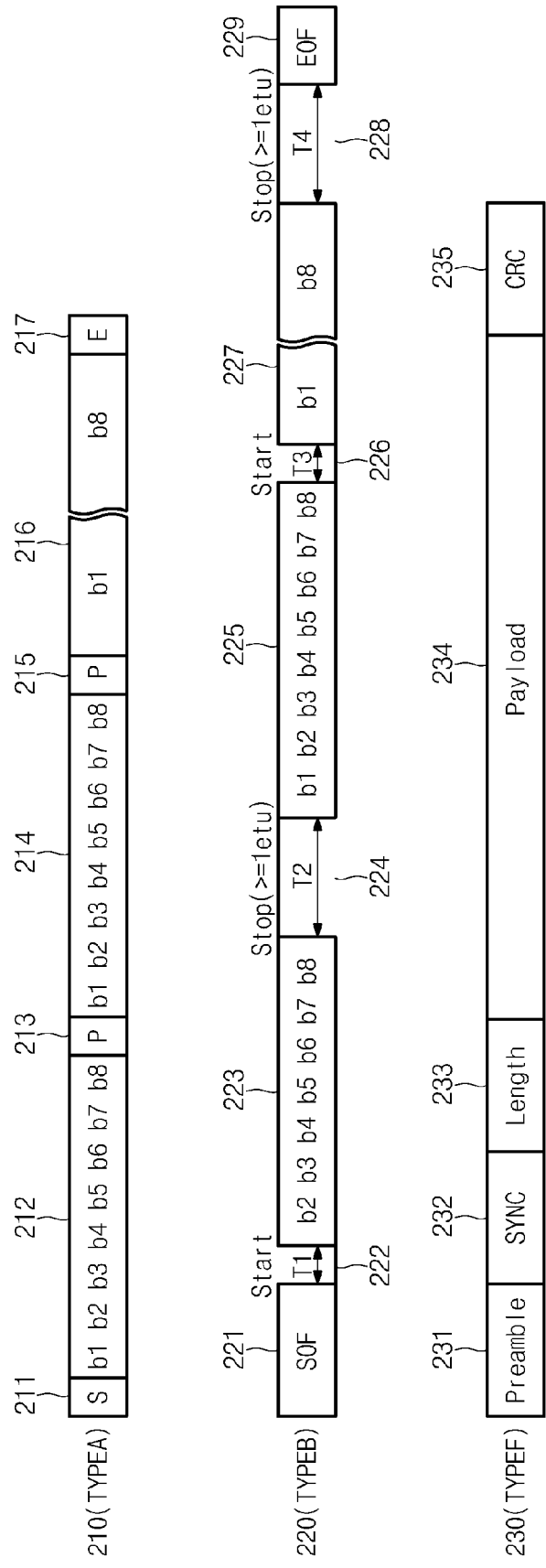
FIG. 2 illustrates communication frame structures of data for use in the NFC system shown in FIG. 1.

FIG. 2 illustrates communication frame structures of data for use in the NFC system shown in FIG. 1. In FIG. 2, a communication frame 210 represents TYPEA 106, a communication frame 220 represents TYPEB 106, and a communication frame 230 represents TYPEF 212 or TYPEF 414.

The communication frame 210 includes a start pattern (S) 211, data patterns 212, 214, and 216, parity patterns 213 and 215, and an end pattern (E) 217.

The communication frame 220 includes a file start (SOF) 221 as a start pattern, data patterns 223, 225, and 227, start periods 222 and 226, stop periods 224 and 228, and a an end-of-file EOF 217 as an end pattern.

The communication frame 230 includes a preamble pattern 231, a synchronization pattern (SYNC) 232 as a start pattern, a length pattern 233, a payload 234 as a data pattern, and a CRC pattern 235.

As shown in FIG. 2, a start bit exists in case of TYPEA, an SOF pattern exists in case of TYPEB, and an SYNC pattern exists in case of TYPEF. Therefore, protocols may be distinguished by comparing the start bit, the SOF pattern, and the SYNC pattern.

Figure 3:
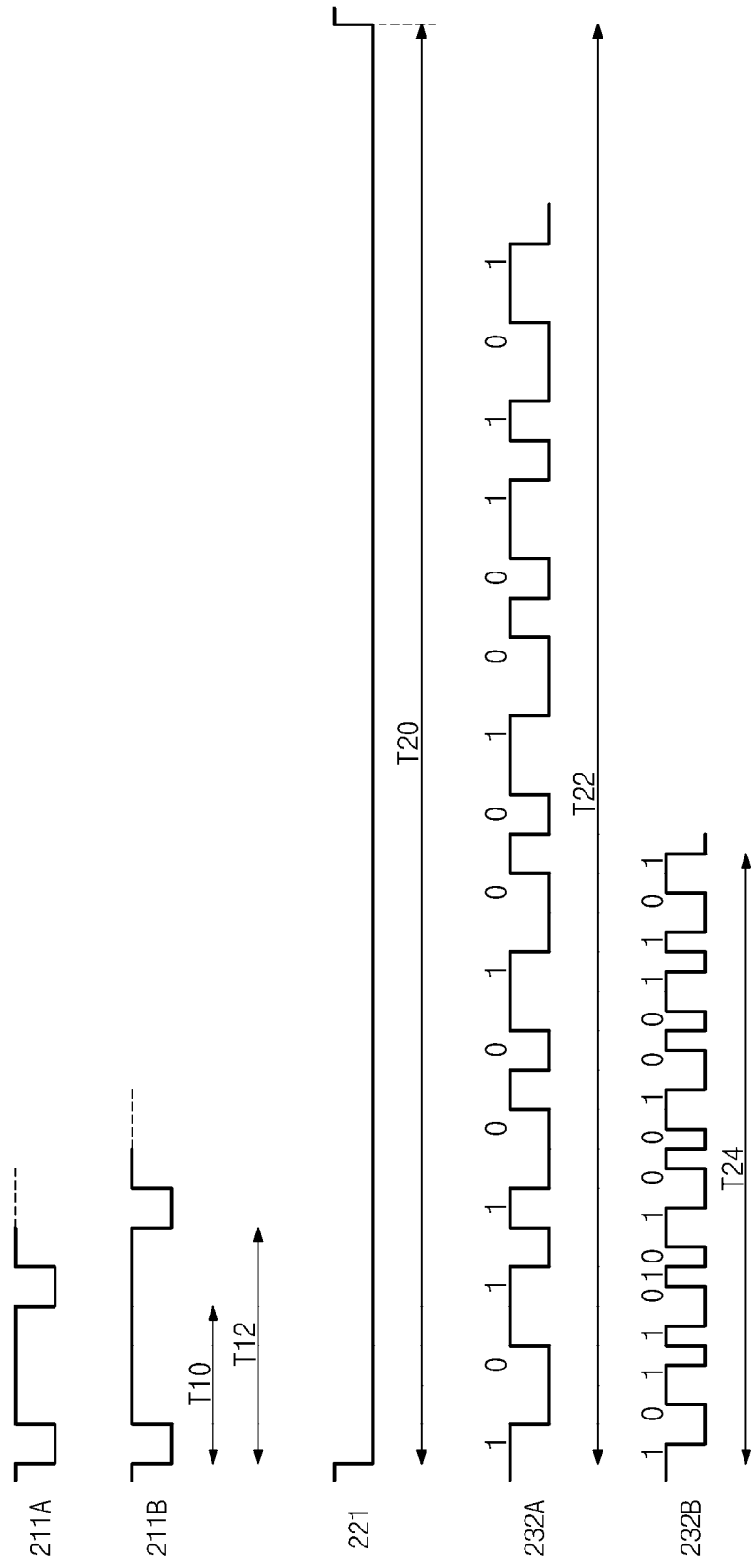
FIG. 3 is a timing diagram comparatively illustrating start patterns among communication frames shown in FIG. 2.

FIG. 3 is a timing diagram comparatively illustrating start patterns among communication frames shown in FIG. 2.

Referring to FIG. 3, a start pattern 211A having low and high levels at a time period T10 is TYPEA 106 and exhibits an S pattern waveform when data is 2. A start pattern 211B having low and high levels at a time period T12 is a TYPEA 106 and exhibits an S pattern waveform when data is 1.

A start pattern 221 having a low level at a time period T20 exhibits an SOF pattern waveform in case of TYPEB 106.

A start pattern 232A having high and low levels at a time period T22 exhibits a SYNC pattern waveform of TYPEF 212.

A start pattern 232B having high and low levels at a time period T24 exhibits an SYNC pattern waveform of TYPEF 424.

In embodiments of the present general inventive concept, a communication mode is rapidly detected by analyzing a start pattern among the communication frame patterns shown in FIG. 3. The analysis of the start pattern is done by a detecting and receiving unit (25 in FIG. 4).

Figure 4:
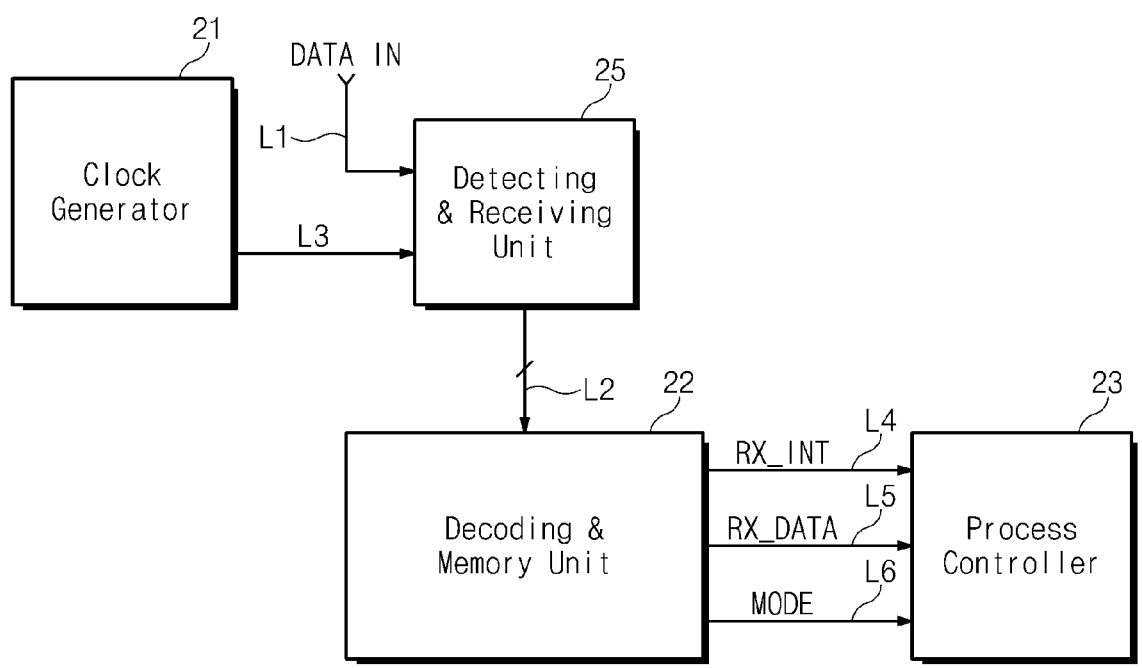
FIG. 4 is a detailed block diagram of an NFC target, according to embodiments of the present general inventive concept, in the NFC system shown in FIG. 1.

FIG. 4 is a detailed block diagram of an NFC target, according to embodiments of the present general inventive concept, in the NFC system shown in FIG. 1.

Referring to FIG. 4, an NFC target serving as a receiving device includes a detecting and receiving unit 25, a clock generator 21, a decoding and memory unit 22, and a process controller 23.

The detecting and receiving unit 25 analyzes a start pattern among communication frame patterns of applied data according to a predetermined sampling clock to detect a communication mode and receive the data. The communication mode indicates which one of NFC protocols includes the communication frame pattern.

The clock generator 21 generates the sampling clock and outputs the generated clock through a line L3. A frequency of the predetermined sampling clock may be a frequency at which data of TYPE 424 is oversampled 8 times.

The decoding and memory unit 22 performs decoding and degrading by a corresponding protocol in response to the detection of the communication mode and stores the degraded data in a FIFO memory.

The process controller 23 reads the degraded data stored in the FIFO memory in response to request data provided from the decoding and memory unit 22 and checks a communication mode.

The NFC target configured as shown in FIG. 4 may detect and process data of TYPEA 106, data of TYPEB 106, data of TYPEF 212, and data of TYPEF 424 when the data is transmitted from an NFC initiator.

In the case that a start pattern is analyzed according to a predetermined sampling clock, an S pattern is included in the start pattern of TYPEA 106. In addition, 1 bit of data behind the S pattern may be further included in the start pattern. As a result, when start patterns are compared with each other, TYPEF 424 and TYPEB 106 are different in timing but TYPEA 106 and TYPEF 212 are not different in timing. Therefore, because it is difficult to distinguish communication modes, when determining whether the start pattern corresponds to a TYPEA 106 protocol or a TYPEF 212 protocol, not only a start pattern S but also 1 bit of data behind the start pattern S is included in a detectable start pattern.

The start pattern is an SOF pattern in the TYPEB 106 protocol and is a SYNC pattern in the TYPEF 212 or the TYPEF 424 protocols.

When the start pattern is analyzed, data of the TYPEF 212 and data of the TYPEA 106 are oversampled twice and data of the TYPEB 106 is oversampled eight times. The TYPEF 424 is oversampled 8 times when the case that a frequency of the sampling clock is 6.78 MHz.

FIG. 5 a flowchart illustrating a communication mode detection operation of a detecting and receiving unit shown in FIG. 4.

At S500, initialization is conducted. At S501, it is checked whether an edge for analyzing a start pattern among communication frame patterns is detected. That is, if there is a high-to-low transition or a low-to-high transition, a data level of a start pattern is determined to be high ("1") or low ("0").

S510, S511, and S512 indicate operations corresponding to a detected TYPEF 424 protocol. In operation S510, it is determined whether a 9A5965A6 hex is detected two bits by two bits, and a waveform 232B shown in FIG. 3 is detected. In operation S511, if the waveform 232B is detected, the TYPEF 424 (FELICA 424) protocol may be selected. In operation S512, encoding information and degrading information on oversampling are output as Manchester encoding (MCS) and BN, respectively, to control the NFC receiver according to the received data. Thereafter, the MCS and BN/2 are provided to the decoding and memory unit (22 in FIG. 4) through the bus line L2. In this case, there is no data degrading because BN is 1.

Returning to FIGS. 5, S520, S521, and S522 correspond to a detected TYPEF 212 protocol. In operation S520, 9A5965A6 Hex is detected two bits by two bits, and a waveform 232A shown in FIG. 3 is detected. In operation S521, it is determined based on the detected waveform 232A that the protocol type is TYPEF 212 (FELICA 212). As a result, when a SYNC pattern (B24D Hex) of TYPEF 212 is detected, the 9A5965A6 Hex must be detected because the SYNC pattern is received after being Manchester-encoded. In addition, since data of the TYPEF 212 is oversampled twice as compared to data of TYPEF 424, the 9A5965A6 Hex is searched two bits by two bits. In operation S522, encoding information of the TYPEF 212 and degrading information on oversampling are output as Manchester encoding (MCS) and BN/2, respectively. Thereafter, the MCS and BN/2 are provided to the decoding and memory unit (22 in FIG. 4) through the bus line L2.

S530, S531, and S532 correspond to a detected TYPEB 106 protocol. in operation S530, it is determined whether 80 to 88 bits of "0" are detected to generate a waveform 221 shown in FIG. 3. When the waveform 221 is detected, it is determined in operation S531 that the protocol is TYPEB 106. In operation S532, encoding information of the TYPEB mode and degrading information on oversampling are output as NRZ (NRZ encoding) and BN/8, respectively. Thereafter, the NRZ and BN/8 are provided to the decoding and memory unit 22 shown in FIG. 4. The decoding and memory unit 22 performs an NRZ encoding on data received through the bus line L2 according to the NRZ information. The decoded data is degraded to ⅛ according to the BN/8 information.

Operations S540, S541, S542, S543, S544, and S545 correspond to detecting whether an NFC protocol of receiving data is TYPEA 106. In operation S540, it is determined whether 2 bits of "0" are detected after detecting the edge in operation S501. Next, it may be determined in operation S541 whether 10-12 bits of "1" are detected after the 2 bits of "0." When 10-12 bits of "1" are detected, a waveform 211B shown in FIG. 3 is detected and thus it is determined that the protocol corresponds to a TYPEA 106 protocol and start data S_DATA is determined to be "1" in operation S542. In operation S543, a logic level of the start data S_DATA, encoding information of the TYPEA 106 mode, and degrading information on oversampling are output as SDATA, Miller encoding (MIL), and bit number/2 (BN/2), respectively. Thereafter, the data SDATA, MIL, and BN/2 are provided to the decoding and memory unit (22 in FIG. 4) through a bus line L2. Accordingly, the decoding and memory unit 22 receives data provided at a line L1 through the bus line L2 and performs Miller encoding according to the MIL information. The decoded data is degraded according to the BN/2 data. In this case, bit number of the decoded data is reduced to half. The degraded data is stored in a FIFO memory for reception. If an end pattern of the data is then detected, the decoding and memory unit 22 applies a receiving interrupt RX_INT to a process controller 23 through a line L4. The data RX_INT stored in the FIFO memory is provided to the process controller 23 through a line L5. At this point, a mode signal MODE detected is also provided to the process controller 23 through a line L6. The process controller 23 checks an accuracy of mode detection and processes data to reduce possibility of data misdetection. The accuracy checking and data processing are done by receiving the receiving interrupt RX_INT, data RX_DARA, and the mode signal MODE and determining whether they are REQA, REQB, and ATR REQ, respectively., it is checked how many bits of "1" are searched at the S511.

When 10 to 12 bits of "1" are not detected, it may be determined that 6 to 8 (bits of) "1" follow the two (bits of) "0," and a waveform 211A shown in FIG. 3 may be detected. Accordingly, it is determined in operation S544 that the protocol corresponds to a TYPEA 106 mode and start data S_DATA is judged as "2." Thereafter, the data SDATA, MIL, and BN/2 are provided to the decoding and memory unit (22 in FIG. 4) through a bus line L2.

As set forth above, a start pattern is detected to rapidly detect a communication mode and data is automatically received without performing an additional operation to set a communication mode.

In other words, a near field communication target 20 or receiver may receive a communication that corresponds to any NFC protocol, such as the TYPEA 106, TYPEB 106, TYPEF 212, and TYPEF 424, and may automatically detect the received protocol without a user input or other configuration between the receiver 20 and a transmitting unit 10. Upon detecting which of the protocols has been received, the receiver 20 may automatically adjust communication settings, such as encoding settings, to communicate via the detected protocol. By this manner a single target 20 or receiver may receive communications in multiple different protocols, may detect the protocol, and may operate the target 20 according to the detected protocol. The same target 20 may then receive a communication from a different transmitter 10 via a different protocol, may detect the different protocol, and may operate the target 20 according to the different protocol.

Although examples of NFC protocols have been provided, the present general inventive concept encompasses any NFC protocols, including protocols not expressly described in the present specification.

In addition, while FIG. 5 illustrates detecting each protocol in series, the protocols may be detected in parallel, such as with multiple segments of a processor or multiple processors or other circuitry. In addition, the protocols may be detected in any order and need not be detected in the particular order illustrated in FIG. 5.

Figure 6A:
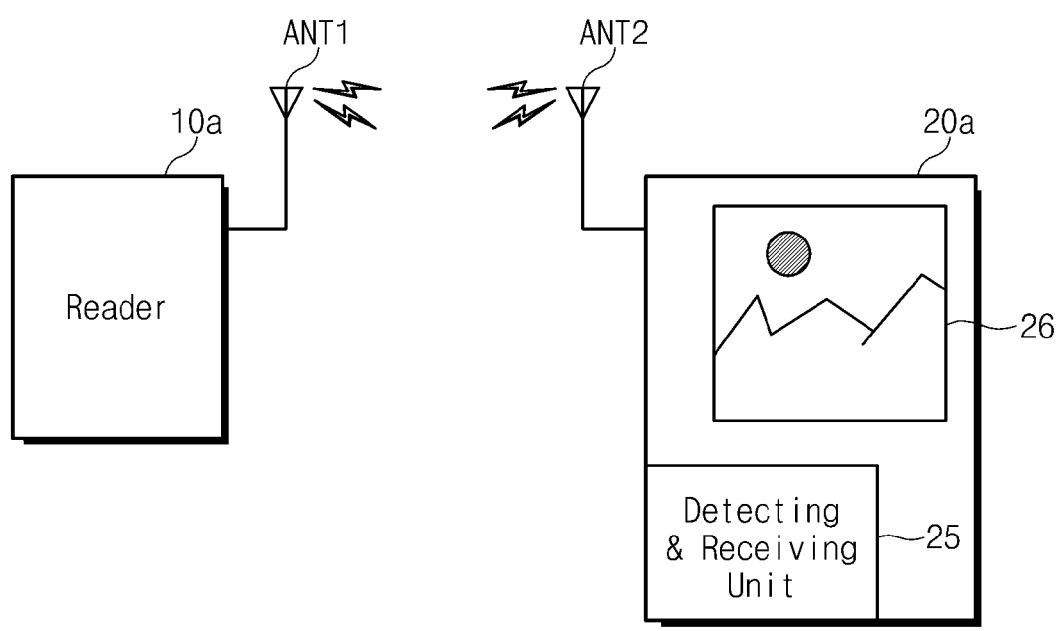
FIG. 6A is an exemplary block diagram illustrating that the NFC system shown in FIG. 1 is applied to a reader and a portable multimedia terminal.

FIG. 6A is an exemplary block diagram illustrating that the NFC system shown in FIG. 1 is applied to a reader and a portable multimedia terminal.

Referring to FIG. 6A, a reader 10a has the same function as an NFC initiator (10 in FIG. 1). A portable multimedia terminal 20a with a built-in smart card includes a detecting and receiving unit 25, which is similar to an NFC target (20 in FIG. 1). The portable multimedia terminal 20a may include a display unit 26 such as a liquid crystal display (LCD).

When the reader 10a transmits data of TYPEA 106, TYPEB 106, TYPEF 212, or TYPEF 424, the portable multimedia terminal 20a rapidly detects a communication mode through the detecting and receiving unit 25 performing a detection control flow such as shown in FIG. 5 and automatically receives data without performing an additional operation to set a communication mode. Thus, receiving operation performance of near field communication (NFC) of the portable multimedia terminal 20a is improved.

Figure 6B:
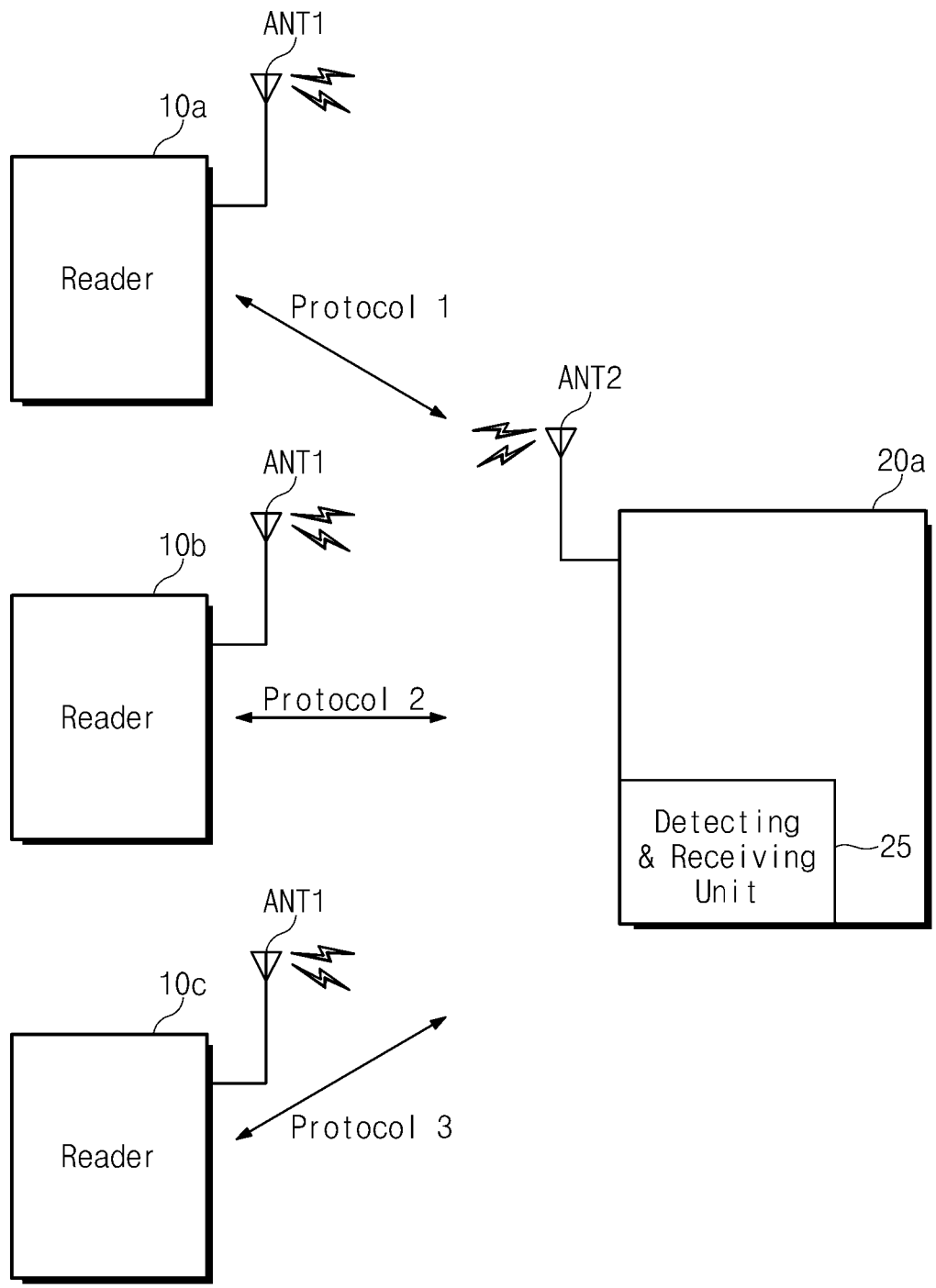
FIG. 6B is a block diagram illustrating a NFC system including a plurality of transmitters having different protocols according to an embodiment of the present general inventive concept.

FIG. 6B illustrates an example embodiment in which a receiver 20a receives multiple different protocols 1, 2, and 3, from different NFC transmitters 10a, 10b, and 10c. The receiver 20a may be configured to process different signals simultaneously with multiple processors, or by alternatingly processing data from each respective signal, or the receiver 20a may be configured to receive and process data corresponding to only one transmitter of 10a, 10b, and 10c at a time. In such a case, the receiver 20a could receive and transmit data from another of the transmitters 10a, 10b, and 10c, during a period when data is not being received from the other transmitters 10a, 10b, and 10c. For example, if the receiver 20a first communicates with the transmitter 10a, then the receiver may be configured to communicate with the transmitter 10b only during a period in which the transmitter 10a is not transmitting data or when the communication between the transmitter 10a and the receiver 20a has been terminated.

As explained so far, it is rapidly detected which one of near field communication (NFC) protocols includes a communication frame pattern of data provided to a receiving device and data is automatically received without performing an additional operation to set a communication mode. Thus, operation performance of the receiving device is improved.

Although embodiments of the inventive concept have been described with respect to a receiving device serving as an NFC target, it will be understood that the inventive concept is not limited thereto and may be applied to other communication terminals.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of detecting a communication mode, comprising:
   receiving a communication frame pattern of data transmitted from a near field communication (NFC) initiator in accordance with a predetermined sampling clock;
   detecting a communication mode indicating which one of a predetermined plurality of NFC protocols includes the communication frame pattern by analyzing a start pattern out of the communication frame pattern;
   wherein the start pattern includes an S pattern corresponding to a TYPEA 106 protocol, and when the start pattern is analyzed, 1 bit of data behind the S pattern is further analyzed to detect the communication mode.

2. The method as set forth in claim 1, wherein the predetermined sampling clock is a clock having a frequency at which data of TYPEF 424 is oversampled eight times.

3. The method as set forth in claim 1, further comprising:
   performing decoding and degrading by a corresponding protocol after detecting the communication mode.

4. A receiving device for near field communication (NFC), comprising:
   a detecting and receiving unit to receive a signal through an antenna, and configured to detect a communication mode indicating which one of a predetermined plurality of NFC protocols includes a communication frame pattern by analyzing a start pattern out of the communication frame pattern of provided data using a predetermined sampling clock, and to receive the data; and
   a decoding and memory unit configured to decode the received data according to the detected communication mode and degrade the decoded received data according to a degrading information of the detected communication mode, and store the degraded data in a memory.

5. The receiving device as set forth in claim 4, which is an NFC target configured to receive data of TYPEA 106, data of TYPEB 106, data of TYPEF 212, and data of TYPEF 424 when the data is transmitted from an NFC initiator.

6. The receiving device as set forth in claim 5, wherein a frequency of the predetermined sampling clock is a frequency at which the data of TYPEF 424 is oversampled eight times.

7. The receiving device as set forth in claim 5, further comprising:
   a process controller configured to read the degraded data stored in the memory in response to request data provided from the decoding and memory unit and check the detected communication mode.

8. The receiving device as set forth in claim 5, wherein the start pattern is a SYNC pattern corresponding to one of the TYPEF 212 and the TYPEF 424 protocol.

9. The receiving device as set forth in claim 8, wherein the start pattern is an SOF pattern corresponding to the TYPE 106 protocol.

10. The receiving device as set forth in claim 9, wherein an S pattern is included in the start pattern corresponding to the TPEA 106 protocol.

11. The receiving device as set forth in claim 10, wherein when the start pattern of TYPEA 106 is analyzed, 1 bit of data behind the S pattern is further included in the start pattern.

12. The receiving device as set forth in claim 11, wherein when the start pattern is analyzed, the data of TYPEA 106 are oversampled twice.

13. A near field communication (NFC) system comprising:
   an NFC initiator configured to transmit data; and
   an NFC target including a detecting and receiving unit configured to detect a communication mode indicating one of a predetermined plurality of NFC protocols by analyzing a start pattern of a communication frame pattern and to provide data to a decoding and memory unit using a predetermined sampling clock, the decoding and memory unit configured to decode the received data according to the detected communication mode, degrade the decoded received data according to a degrading information of the detected communication mode, and store the degraded data in a memory.

14. The NFC system as set forth in claim 13, wherein the NFC initiator is a card reader.

15. The NFC system as set forth in claim 14, wherein the NFC target is a portable multimedia terminal with a built-in smart card.

16. A method of detecting a communication protocol in a near field communication (NFC) receiver, the method comprising:
   receiving a near field communication including data; and
   determining a protocol of the near field communication by analyzing a start pattern of a communication frame pattern of the data,
   wherein determining the protocol includes detecting whether the start pattern includes a 1-bit 9A5965A6 hex, and
   setting a communication mode to correspond to a FELICIA 424 protocol when the start pattern includes the 1-bit 9A5965A6 hex.

17. The method according to claim 16, wherein determining the protocol includes determining whether the start pattern corresponds to one of a FELICIA 424 protocol, a FELICIA 212 protocol, a TYPEA 106 protocol, and a TYPEB 106 protocol, and
   the method further includes setting a communication mode to correspond to the detected protocol selected from among the FELICIA 424 protocol, the FELICIA 212 protocol, the TYPEA 106 protocol, and the TYPEB 106 protocol.

18. The method according to claim 17, wherein setting the communication mode includes setting encoding and degrading settings of the NFC receiver.

19. The method according to claim 16, wherein determining a protocol of the NFC includes sampling the start pattern at a frequency to correspond to an 8-times oversampling of a FELICIA 424 protocol.

20. The method of claim 16, wherein determining the protocol of the NFC includes, before analyzing the start pattern of the data, detecting an edge of the communication frame pattern.

21. A near field communication (NFC) receiver, comprising:
   a detection circuit to receive a near field communication signal including data, and to detect a protocol of the received data from among a predetermined plurality of protocols by analyzing a start pattern of a communication frame pattern of the data; and
   a decoding and memory unit configured to decode the received data according to the detected protocol and degrade the decoded received data according to a degrading information of the detected protocol and store the degraded data in a memory.

22. The NFC receiver according to claim 21, further comprising:

a clock generator to generate a sampling clock at which the detection circuit samples the start pattern of the data.

23. The NFC receiver according to claim 21, further comprising a decoding unit to receive the data and control signals from the detection circuit, and to decode the data according to the detected protocol.

24. The NFC receiver according to claim 23, further comprising a process controller to receive the decoded data and a mode selection signal corresponding to the detected protocol and to control an operation of the NFC receiver according to the decoded data.

25. A near field communication (NFC) system, comprising:
   an NFC transmitter to transmit an NFC signal including data; and
   an NFC receiver to receive the NFC signal and to detect a protocol of the received data from among a predetermined plurality of protocols by analyzing a start pattern of a communication frame pattern of the data and decode the received data according to the detected protocol and degrade the decoded received data according to a degrading information of the detected protocol and store the degraded data in a memory.

* * * * *